(12) United States Patent
Dong et al.

(10) Patent No.: US 12,513,353 B2
(45) Date of Patent: *Dec. 30, 2025

(54) METHOD AND APPARATUS FOR CONTROLLING POP-UP WINDOW, AND MEDIUM AND ELECTRONIC DEVICE

(71) Applicant: BEIJING BYTEDANCE NETWORK TECHNOLOGY CO., LTD., Beijing (CN)

(72) Inventors: Zesong Dong, Beijing (CN); Huijun Yu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 39 days.

This patent is subject to a terminal disclaimer.

(21) Appl. No.: 18/731,320

(22) Filed: Jun. 2, 2024

(65) Prior Publication Data

US 2024/0323476 A1   Sep. 26, 2024

Related U.S. Application Data

(63) Continuation of application No. 17/761,171, filed as application No. PCT/CN2020/114796 on Sep. 11, 2020, now Pat. No. 12,034,995.

(30) Foreign Application Priority Data

Sep. 17, 2019 (CN) .......................... 201910877327.X

(51) Int. Cl.
*H04N 21/431* (2011.01)
*G06F 3/0485* (2022.01)
*H04N 21/4725* (2011.01)

(52) U.S. Cl.
CPC ......... *H04N 21/431* (2013.01); *G06F 3/0485* (2013.01); *H04N 21/4725* (2013.01)

(58) Field of Classification Search
None
See application file for complete search history.

(56) References Cited

U.S. PATENT DOCUMENTS 9,532,111 B1 * 12/2016 Christie ........... H04N 21/21815
10,225,602 B1 * 3/2019 Sirpal .................. H04N 21/482
(Continued)

FOREIGN PATENT DOCUMENTS

CA    2731739 A1 *  3/2010  ......... H04N 21/4316
CN    102598701 A     7/2012
(Continued)

OTHER PUBLICATIONS

International Patent Application No. PCT/CN2020/114796; Int'l Search Report; dated Dec. 16, 2020; 2 pages.
(Continued)

*Primary Examiner* — William J Kim
(74) *Attorney, Agent, or Firm* — BakerHostetler

(57) ABSTRACT

The present disclosure describes techniques for playing videos. The techniques comprise presenting a video playing page; popping up a window on the video playing page; displaying prompt screens in the window, wherein each prompt screen in the window corresponds to a content item; displaying additional prompt screens in the window in a horizontally scrolled manner; and in response to receiving a trigger operation performed on a prompt screen in the window, displaying a content item corresponding to the prompt screen in the video playing page.

18 Claims, 8 Drawing Sheets

(56) References Cited

U.S. PATENT DOCUMENTS

| | | | |
|---|---|---|---|
| 2002/0041291 A1* | 4/2002 | Vale | G06F 3/0481 |
| | | | 715/785 |
| 2011/0119621 A1 | 5/2011 | Cho et al. | |
| 2012/0005623 A1* | 1/2012 | Ishak | G06F 3/0485 |
| | | | 715/786 |
| 2012/0060092 A1* | 3/2012 | Hill | H04N 21/4882 |
| | | | 715/716 |
| 2013/0179787 A1 | 7/2013 | Brockmann et al. | |
| 2015/0365719 A1* | 12/2015 | Hoffert | H04N 21/4331 |
| | | | 725/52 |
| 2016/0054905 A1 | 2/2016 | Chai et al. | |
| 2016/0239198 A1* | 8/2016 | Shenkler | H04N 21/4316 |
| 2018/0091863 A1 | 3/2018 | Anguiano | |
| 2018/0113579 A1* | 4/2018 | Johnston | H04N 21/4826 |
| 2018/0227534 A1 | 8/2018 | Zhou et al. | |
| 2018/0316963 A1* | 11/2018 | Lee | H04N 21/482 |

FOREIGN PATENT DOCUMENTS

| | | | | | |
|---|---|---|---|---|---|
| CN | 304005603 S | | 1/2017 | | |
| CN | 107509112 A | | 12/2017 | | |
| CN | 108668172 A | | 10/2018 | | |
| CN | 109348278 A | | 2/2019 | | |
| CN | 110012339 A | | 7/2019 | | |
| CN | 110572705 A | | 12/2019 | | |
| CN | 110620949 A | | 12/2019 | | |
| EP | 2752755 A1 | * | 7/2014 | | G06F 3/0346 |
| EP | 3396968 A1 | * | 10/2018 | | H04N 21/4312 |
| GB | 2544116 A | * | 5/2017 | | H04N 21/4314 |
| JP | 2013-004055 A | | 1/2013 | | |
| WO | WO-2008033777 A1 | * | 3/2008 | | G06F 3/0482 |

OTHER PUBLICATIONS

Dannie Vinther "Creating horizontal scrolling containers the right way [CSS Grd]" Online—Sep. 24, 2018; retrieved on Oct. 5, 2023; URL: https://uxdesign.cc/creating-horizontal-scrolling-containers-the-right-way-css-grid-c256f64fc585; 2018.

* cited by examiner

METHOD AND APPARATUS FOR CONTROLLING POP-UP WINDOW, AND MEDIUM AND ELECTRONIC DEVICE

CROSS-REFERENCE TO RELATED APPLICATIONS

The present application is a continuation of U.S. patent application Ser. No. 17/761,171 filed on Mar. 16, 2022, which is the U.S. National Stage of International Application No. PCT/CN2020/114796, filed on Sep. 11, 2020, which claims priority to Chinese Patent Application No. 201910877327.X, titled "METHOD AND APPARATUS FOR CONTROLLING POP-UP WINDOW, AND MEDIUM AND ELECTRONIC DEVICE", filed on Sep. 17, 2019, all of which are incorporated herein by reference in their entireties.

FIELD

The present disclosure relates to a method and device for controlling a pop-up window, a medium, and an electronic device.

BACKGROUND

When a user browses a website or a software page of a mobile terminal, if there is hot information on the website or the software obtained based on a current discussion or viewing popularity, the hot information is usually displayed on a separate hot statistics page when displaying the hot information, and the user can only select the existing hot topic information on the hot topic statistics page, and then the website or software jumps to a display page of the hot topic information according to the hot topic selected by the user. If the user wants to select another hot topic, it is only required to go back to the hot topic statistics page again, so that the user needs to jump back and forth between multiple pages to realize the switching of the hot topic information for watching, which will not only occupy a lot of server resources, but also affect the response speed of the web page or the mobile terminal, resulting in a bad user experience.

SUMMARY

This Summary part is provided to introduce concepts in a simplified form, which will be described in detail in the following detailed description part. This summary part is not intended to identify key features or essential features of the claimed technical solution, nor is it intended to be used to limit the scope of the claimed technical solution.

In a first aspect, a method for controlling a pop-up window is provided according to the present disclosure, which includes:

playing a target sub-video belonging to a first target hot topic when entering a hot video playing page; and controlling a pop-up window to pop up in response to receiving a pop-up window display instruction, where the pop-up window display instruction is generated in response to a click instruction received in an area of prompting more hot topics on the hot video playing page, where the pop-up window includes video prompt screens corresponding to multiple candidate hot topics, the video prompt screens are displayed in a horizontally scrolled manner in the pop-up window, and the first target hot topic is included in the candidate hot topics, a video prompt screen corresponding to the first target hot topic is partially displayed at a boundary of the pop-up window.

In a second aspect, a device for controlling a pop-up window is provided according to the present disclosure, the device includes: a first playing module and a first controlling module. The first playing module is configured to display a target sub-video belonging to a first target hot topic when entering a hot video playing page. The first controlling module is configured to control a pop-up window to pop up in response to receiving a pop-up window display instruction, where the pop-up window display instruction is generated in response to a click instruction received in an area of prompting more hot topics on the hot video playing page. The pop-up window includes video prompt screens corresponding to multiple candidate hot topics, the video prompt screens are displayed in a horizontally scrolled manner in the pop-up window, and the first target hot topic is included in the candidate hot topics, a video prompt screen corresponding to the first target hot topic is partially displayed at a boundary of the pop-up window.

In a third aspect, a computer-readable medium is provided according to the present disclosure, which includes a computer program stored thereon. The program, when executed by a processing device, implements the steps of the method in the first aspect.

In a fourth aspect, an electronic device is provided according to the present disclosure, which includes a storage device and a processing device. The storage device is configured to store a computer program. The processing device is configured to execute the computer program in the storage device, to perform steps of the method in the first aspect.

With the above technical solution, the target sub-video belonging to the first target hot topic is directly played when entering the hot video playing page, so that the user can quickly obtain the hot topic content. After entering the hot video playing page, in response to receiving a pop-up window display instruction, the pop-up window is controlled to be popped up, so that the user can view other candidate hot topics by clicking on the area of prompting more hot topics without exiting the hot video playing page in a case that the user views the hot topic content after entering the hot video playing page. The pop-up window includes video prompt screens corresponding to multiple candidate hot topics, so that the user can obtain the specific content of the hot topics more clearly and intuitively. The video prompt screens can be displayed in a horizontally scrolled manner in the pop-up window, so that the number of displayed hot topics displayed in the pop-up window is not limited to the size of the pop-up window, and the user can view more candidate hot topics in the pop-up window. The video prompt screen corresponding to the first target hot topic is partially displayed at a boundary of the pop-up window when entering the hot video playing page, so that when the pop-up window pops up for the first time after entering the hot video playing page, more display space is reserved for other candidate hot topics in the pop-up window, so that the user can view more candidate hot topics without sliding the content of the pop-up window.

Other features and advantages of the present disclosure will be described in detail in the following detailed description.

BRIEF DESCRIPTION OF THE DRAWINGS

The above and other features, advantages and aspects of embodiments of the present disclosure will become more apparent when taken in conjunction with the drawings and with reference to the following detailed description. Throughout the drawings, the same or similar reference numbers refer to the same or similar elements. It should be understood that the drawings are schematic and that the components and elements are not necessarily drawn to scale. In the drawings.

DETAILED DESCRIPTION OF EMBODIMENTS

Figure 1:
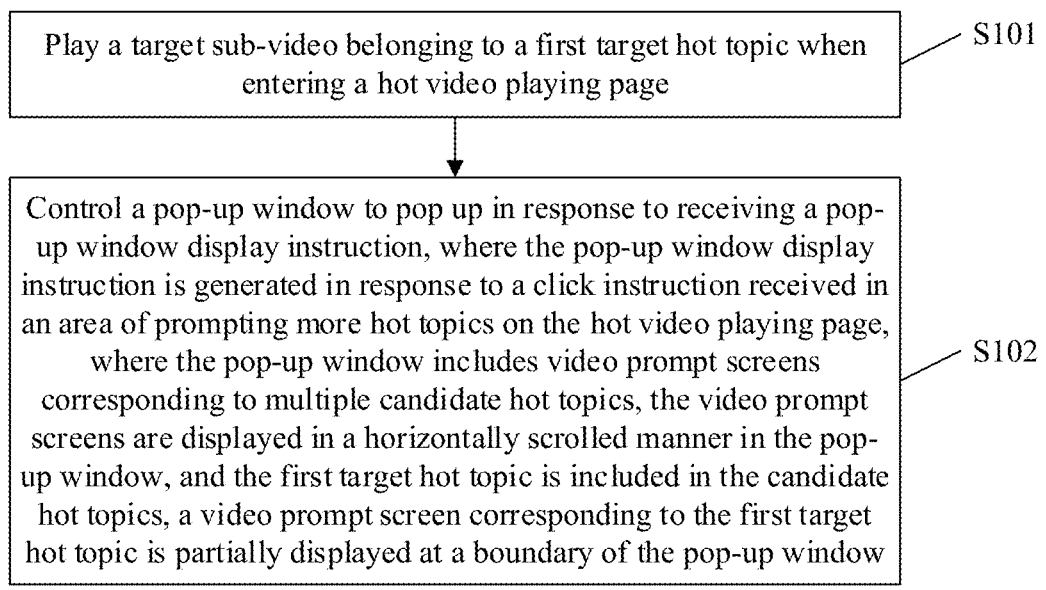
FIG. 1 is a flowchart of a method for controlling a pop-up window according to an embodiment of the present disclosure.

Embodiments of the present disclosure will be described in more detail below with reference to the drawings. Although certain embodiments of the present disclosure are shown in the drawings, it should be understood that the present disclosure may be embodied in various forms and should not be construed as limited to the embodiments set forth herein, but rather are provided for the purpose of more thorough and complete understanding of the present disclosure. It should be understood that the drawings and embodiments of the present disclosure are only for exemplary purposes, and are not intended to limit the protection scope of the present disclosure.

It should be understood that the various steps described in the method embodiments of the present disclosure may be performed in different orders and/or in parallel. Furthermore, method embodiments may include additional steps and/or omit the illustrated steps. The scope of the present disclosure is not limited in this regard.

The term "including" and variations thereof are inclusive, that is, "including but not limited to". The term "based on" means "based at least in part on". The term "one embodiment" means "at least one embodiment", the term "another embodiment" means "at least one another embodiment", the term "some embodiments" means "at least some embodiments". Relevant definitions of other terms will be given in the description below.

It should be noted that concepts such as "first" and "second" mentioned in the present disclosure are only used to distinguish different devices, modules or units, and are not used to limit the order or interdependence of functions performed by these devices, modules or units.

It should be noted that the definitions "a", "multiple" and "a plurality" mentioned in the present disclosure are illustrative rather than restrictive, and those skilled in the art should understand that unless the context clearly indicates otherwise, they should be understood as "one or more of".

The names of messages or information exchanged between multiple devices in the embodiments of the present disclosure are only for illustrative purposes, and are not intended to limit the scope of these messages or information.

FIG. 1 is a flowchart of a method for controlling a pop-up window according to an embodiment of the present disclosure. As shown in FIG. 1, the method includes step S101 and step S102.

In step S101, when entering a hot video playing page, a target sub-video belonging to a first target hot topic is played.

The hot topic may be, for example, "dare not drink milk tea after sorting garbage", and each hot topic has multiple sub-videos related to the hot topic, which may be videos uploaded by multiple different or the same video owner and are related to the topic "dare not drink milk tea after sorting garbage". The hot video playing page is used for playing a sub-video belonging to the hot topic.

There are various ways to enter the hot video playing page. For example, the user may enter the hot video playing page by clicking an entry prompt of the hot video playing page in a normal video playing page. When a video played in the normal video playing page is a sub-video belonging to any hot topic, prompt words "name+popularity related to a hot topic of this video" may be displayed at the bottom of the normal video playing page, and the user may enter the hot video playing page by clicking an area where the prompt words are located. In addition, the user may also click on any one of hot topics displayed on a hot topic display page to enter the hot video playing page to play the sub-video belonging to the hot topic.

The first target hot topic may be determined according to a link clicked by a user when entering the hot video playing page. For example, if the link clicked by the user when entering the hot video playing page corresponds to a third hot topic, the third hot topic is determined to be the first target hot topic, and a target sub-video belonging to the third hot topic is played. The target sub-video may be any one of multiple hot videos in the third hot topic. In an embodiment, if the user enters the hot video playing page by clicking on the third hot topic among the multiple hot topics displayed on the hot topic display page, the target sub-video may be a random sub-video belonging to the third hot topic clicked by the user, or a sub-video ranked first belonging to the third hot topic clicked by the user. If the user enters the hot video playing page by clicking the entry prompt of the hot video playing page displayed at the bottom of the normal video playing page, the first target hot topic may be a hot topic to which the video being played on the normal video playing page before the playing page jumps belongs, and the target sub-video may be a video being played on the normal video playing page before the playing page jumps.

When the target sub-video belonging to the first target hot topic is played on the hot video playing page, all sub-videos belonging to the first target hot topic will be played in the order of the sub-videos belonging to the first target hot topic. For example, after a sub-video is played, it may automatically jump to a next sub-video for playing, without a manual operation of the user. After all the sub-videos belonging to the first target hot topic are played, sub-videos belonging to a next hot topic of the first target hot topic may be continually played in an order of hot topics, or the sub-videos belonging to the first target hot topic are still played in a loop manner until the user inputs an instruction to switch to another hot topic. The device for displaying the hot video playing page may be any device, for example, a smartphone, a tablet computer, and the like.

In step S102, in response to receiving a pop-up window display instruction, the pop-up window is controlled to pop up. The pop-up window display instruction is generated in response to a click instruction received in an area of prompting more hot topics on the hot video playing page. The pop-up window includes video prompt screens corresponding to multiple candidate hot topics, the video prompt screens can be displayed in a horizontally scrolled manner in the pop-up window, and the first target hot topic is included in the candidate hot topics, a video prompt screen corresponding to the first target hot topic is partially displayed at a boundary of the pop-up window.

The pop-up window is used to display a currently selectable candidate hot topics to the user, and the candidate hot topics are displayed in a form of video prompt screens corresponding to the candidate hot topics. A video prompt screen may include content of any sub-video belonging to the candidate hot topic corresponding to the video prompt screen, and may also include any information related to the candidate hot topic such as the subject name, text description, playing popularity, and the number of sub-videos belonging to the candidate hot topic.

Figure 2:
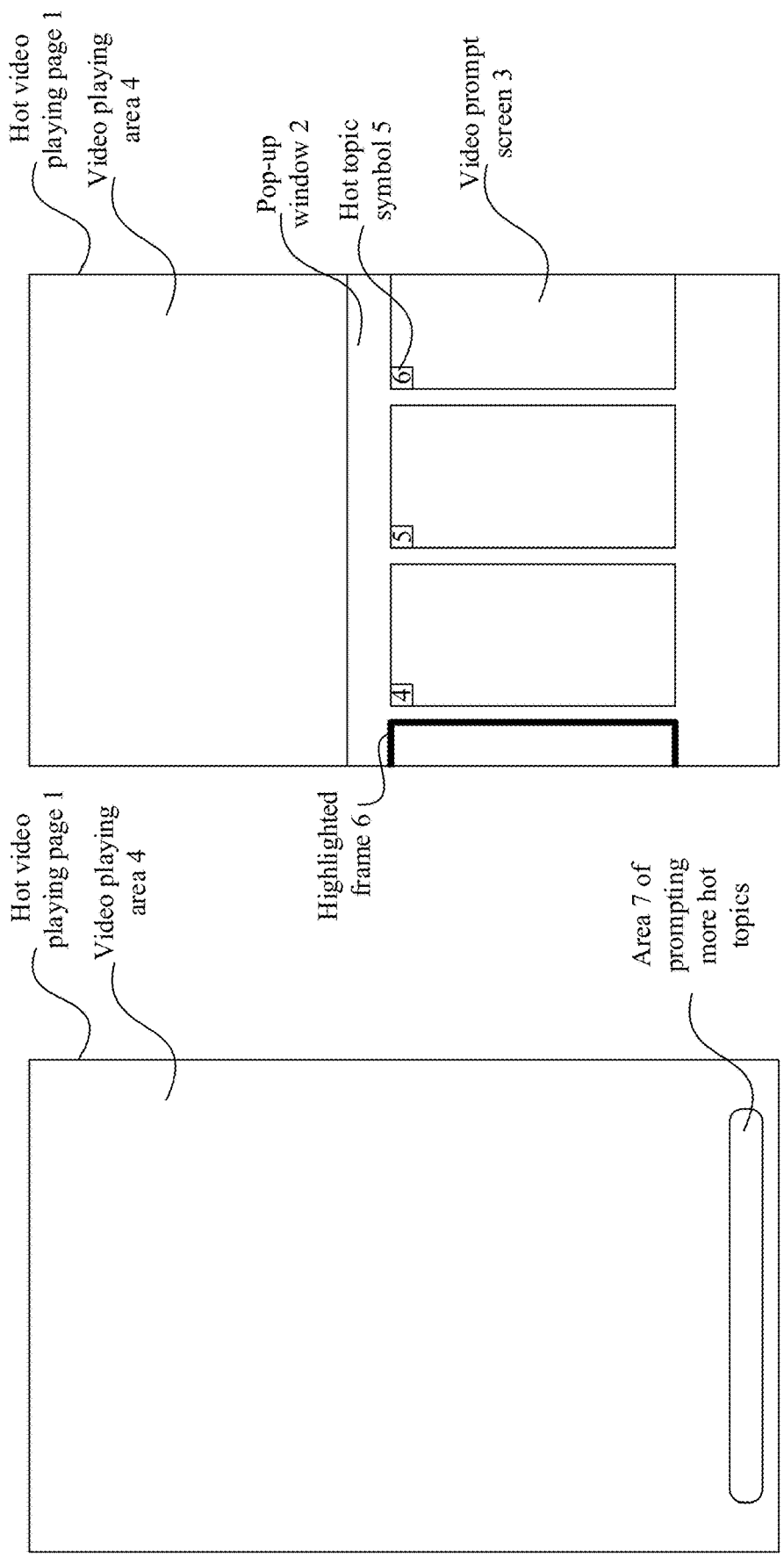
FIG. 2*a* is a schematic diagram showing an effect of a hot video playing page when a pop-up window does not pop up according to an embodiment of the present disclosure.
FIG. 2*b* is a schematic diagram showing an effect of a hot video playing page after a pop-up window pops up according to an embodiment of the present disclosure.

The user may click an area of prompting more hot topics on the hot video playing page to input the pop-up window display instruction, so that the pop-up window in the hot video playing page pops up. The area of prompting more hot topics may be as shown in FIG. 2a. FIG. 2a is a schematic diagram of an effect of a hot video playing page when a pop-up window does not pop up according to an embodiment of the present disclosure. After entering the hot video playing page 1, the sub-video belonging to the hot topic is played in the video playing area 4, and there is an area 7 of prompting more hot topics at the bottom of the page to prompt the user to select other candidate hot topics in the current page. In the area 7 of prompting more hot topics, the topics of all candidate hot topics may be displayed in a scrolled manner, so that the user get an overview of more candidate hot topics through the topics of candidate hot topics displayed in a scrolled manner in the area 7 without clicking on the area 7 to pop up the pop-up window.

After receiving the pop-up window display instruction, the pop-up window will pop up, and an effect after the pop-up window pops up may be as shown in FIG. 2b. FIG. 2b is a schematic diagram of an effect of a hot video playing page after a pop-up window pops up according to an embodiment of the present disclosure. As shown in FIG. 2b, the pop-up window 2 pops up from the bottom of the hot video playing page 1, and the pop-up window 2 may cover the video playing area 4 in an opaque form, or cover the video playing area 4 in a partially transparent form. In the pop-up window 2 in FIG. 2b, it can be seen that a total of four video prompt screens 3 corresponding to four hot topics from the third hot topic to the sixth hot topic are displayed, and an upper left corner of each video prompt screen 3 shows a hot topic symbol 5 of the hot topic corresponding to the video prompt screen 3, because the leftmost video prompt screen 3 in the pop-up window 2 is not completely displayed, the hot topic symbol 5 of the third hot topic corresponding to the video prompt screen is not displayed in the pop-up window 2. The video prompt screens may be displayed in a horizontally scrolled manner in the pop-up window, so that the user can input a sliding instruction to slide the video prompt screens 3 in the pop-up window 2 left and right to view other candidate hot topics that are not displayed in the pop-up window 2. As shown in FIG. 2b, the third hot topic serves as the first target hot topic which is determined after the user enters the hot video playing page 1, so the video prompt screen 3 corresponding to the first target hot topic is partially displayed in the pop-up window 2 at the left most boundary.

In addition, a position of the video prompt screen corresponding to the first target hot topic displayed on the pop-up window may also be related to an order of the hot topic symbols of the first target hot topic in all candidate hot topics. For example, if there are a total of 10 candidate hot topics played on the hot video playing page, and the tenth candidate hot topic is determined to be the first target hot topic, the video prompt screen corresponding to the first target hot topic may also be partially displayed on the right most boundary of the pop-up window, so that the video prompt screens corresponding to the seventh to ninth hot topics can be displayed on the left side of the video prompt screen corresponding to the first target hot topic. The position of the video prompt screen corresponding to the first target hot topic displayed on the pop-up window may be changed according to the actual situation, as long as the video prompt screen corresponding to the first target hot topic can be partially displayed on the boundary of the pop-up window, to cause the pop-up window to have more space to display video prompt screens corresponding to other candidate hot topics.

In a possible embodiment, when the pop-up window pops up and a video prompt screen corresponding to a hot topic to which a sub-video being played belongs is displayed in the pop-up window, the video prompt screen is highlighted so that a display state of the prompt screen in the pop-up window is different from that of other video prompt screens in the pop-up window. The boundary of the video prompt screen 3 corresponding to the third hot topic determined to be the first target hot topic may be displayed by thickening the boundary of the video prompt screen, for example, as shown by the highlighted boundary 6 in FIG. 2b. Alternatively, the boundary of the video prompt screen 3 corresponding to the third hot topic determined to be the first target hot topic may be displayed by adding a boundary of a special color outside the boundary of the video prompt screen, or by changing a background color within a certain range around the video prompt screen.

With the above technical solution, the target sub-video belonging to the first target hot topic is directly played when entering the hot video playing page, so that the user can quickly obtain the hot topic content. After entering the hot video playing page, in response to receiving a pop-up window display instruction, the pop-up window is controlled to be popped up, so that the user can view other candidate hot topics by clicking on the area of prompting more hot topics without exiting the hot video playing page in a case that the user views the hot topic content after entering the hot video playing page. The pop-up window includes video prompt screens corresponding to multiple candidate hot topics, so that the user can obtain the specific content of the hot topics more clearly and intuitively. The video prompt screens can be displayed in a horizontally scrolled manner in the pop-up window, so that the number of displayed hot topics displayed in the pop-up window is not limited to the size of the pop-up window, and the user can view more candidate hot topics in the pop-up window. The video prompt screen corresponding to the first target hot topic is partially displayed at a boundary of the pop-up window when entering the hot video playing page, so that when the pop-up window pops up for the first time after entering the hot video playing page, more display space is reserved for other candidate hot topics in the pop-up window, so that the user can view more candidate hot topics without sliding the content of the pop-up window.

Figure 3:
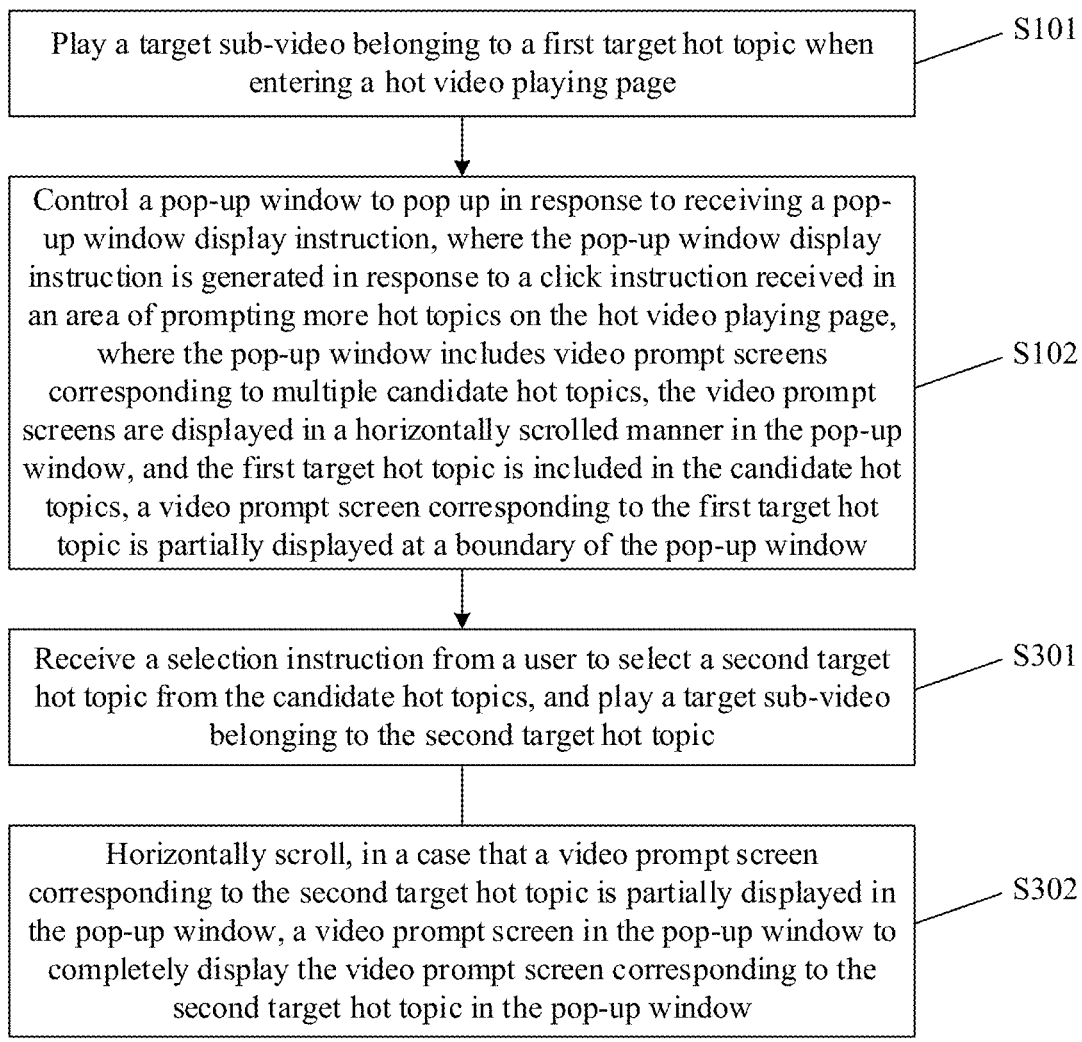
FIG. 3 is a flow chart of a method for controlling a pop-up window according to another embodiment of the present disclosure.

FIG. 3 is a flow chart of a method for controlling a pop-up window according to another embodiment of the present disclosure. As shown in FIG. 3, in addition to steps S101 and S102 shown in FIG. 1, the method further includes steps S301 to S303.

In step S301, a selection instruction from a user to select a second target hot topic from the candidate hot topics is received, and a target sub-video belonging to the second target hot topic is played. The user may select the second target hot topic that he wants to play by, for example, clicking on other video prompt screens displayed in the pop-up window. After receiving the selection instruction from the user, the target sub-video belonging to the second target hot topic may be played. The manner for determining the target sub-video belonging to the second target hot topic may be the same as or different from the manner for determining the target sub-video belonging to the first target hot topic. The first target hot topic and the second target hot topic may be the same candidate hot topic, that is, when the third hot topic needs to be played when entering the hot video playing page, the third hot topic may be determined to be the first target hot topic, when the user selects the third hot topic as the second target hot topic in response to the selection instruction inputted in the pop-up window on the hot video playing page, the third hot topic may also be determined to be the second target hot topic. The descriptions such as "first" and "second" are only for distinguishing target hot topics determined in different situations, and are not used to limit the nature or order of target hot topics.

In step S302, in a case that the video prompt screen corresponding to the second target hot topic is partially displayed in the pop-up window, the video prompt screen in the pop-up window is horizontally scrolled to completely display the video prompt screen corresponding to the second target hot topic in the pop-up window. For example, if the second target hot topic determined in response to the selection instruction inputted by the user is the fifth hot topic shown in FIG. 2b, the target sub-video in the fifth hot topic may be played directly. If the second target hot topic determined in response to the selection instruction inputted by the user is the sixth hot topic shown in FIG. 2b, since the video prompt screen corresponding to the sixth hot topic is not completely displayed in the pop-up window, it is required to move the video prompt screen corresponding to the sixth hot topic to the pop-up window for completely displaying, and an effect after moving may be as shown in FIG. 4a or FIG. 4b.

Figure 4B:
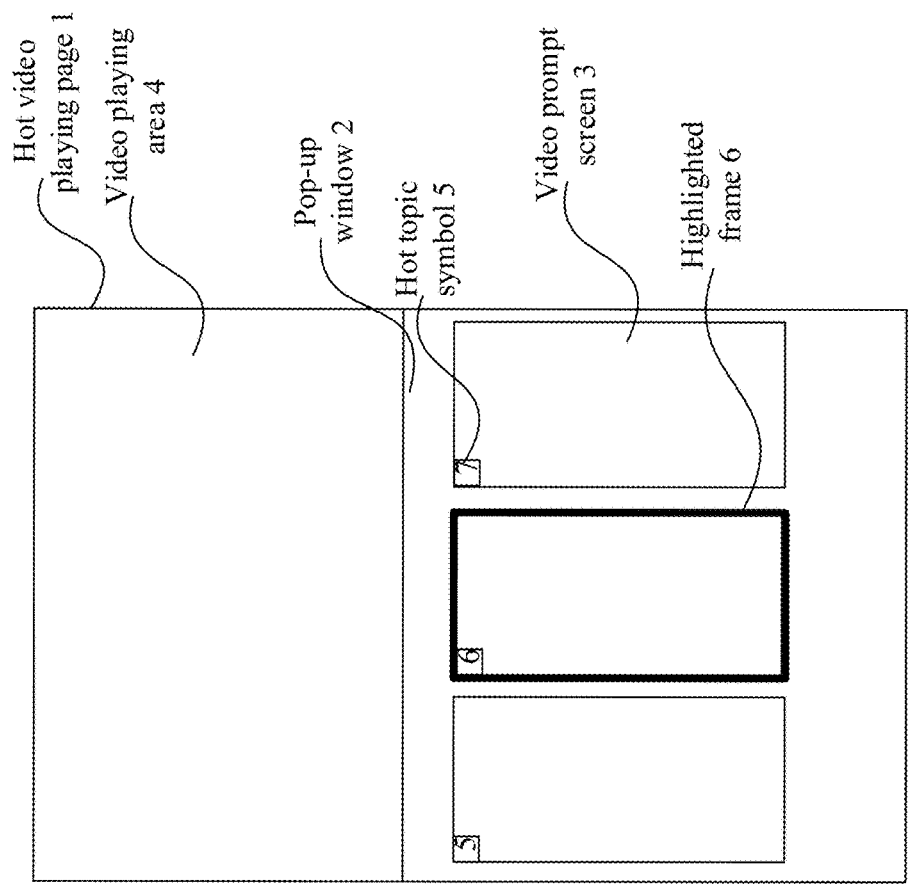
FIG. 4*a* and FIG. 4*b* each shows a schematic diagram of an effect after a video prompt screen corresponding to the second target hot topic is moved to the pop-up window for completely displaying.
Figure 4A:
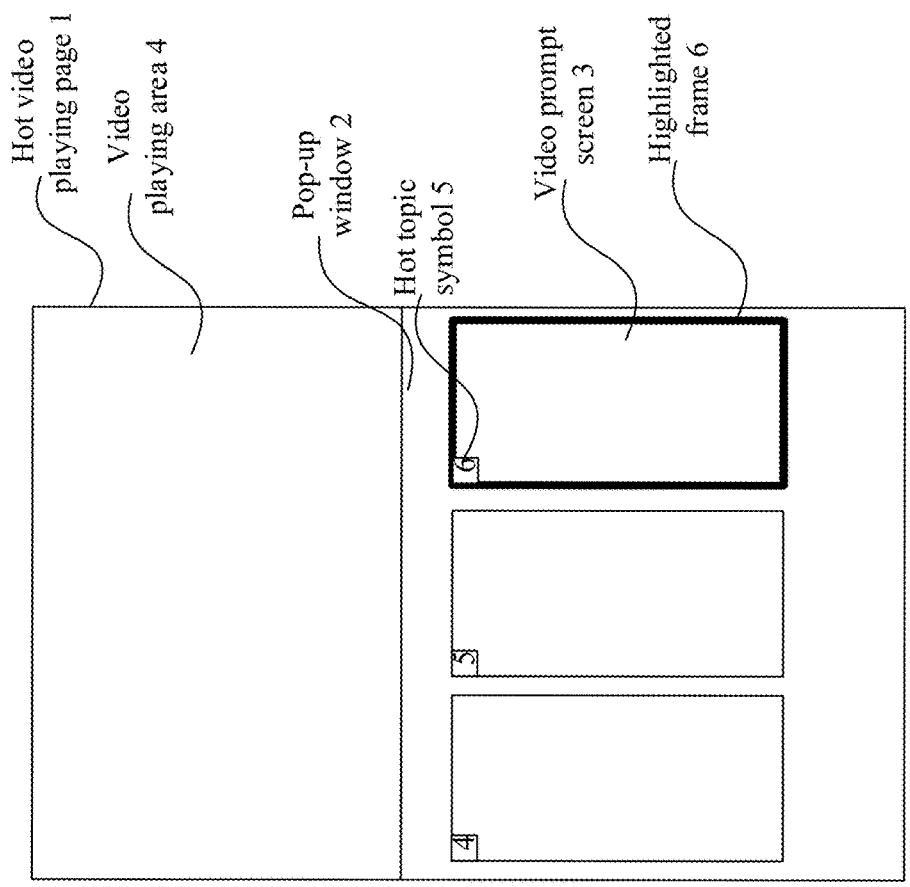

FIG. 4a and FIG. 4b each shows a schematic diagram of an effect after a video prompt screen corresponding to the second target hot topic is moved to the pop-up window for completely displaying. In FIG. 4a, the video prompt screen corresponding to the sixth hot topic which is determined to be the second target hot topic is moved to the left for a first distance, so that the video prompt screen corresponding to the sixth hot topic can be completely displayed in the pop-up window, the other video prompt screens on the left side of the video prompt screen corresponding to the sixth hot topic are also moved correspondingly for the first distance to ensure that the relative position between adjacent video prompt screens remains unchanged. In FIG. 4b, the video prompt screen corresponding to the sixth hot topic which is determined to be the second target hot topic is moved to the left for a second distance, so that the video prompt screen corresponding to the sixth hot topic can be located in a center area of the pop-up window, the other video prompt screens on the left and right sides of the video prompt screen corresponding to the sixth hot topic are also moved accordingly for a second distance to ensure that the relative position between adjacent video prompt screens remains unchanged.

In a possible embodiment, the video prompt screen corresponding to the second target hot topic which is determined in response to the selection instruction inputted by the user is highlighted, so that the display state of the video prompt screen is different from other video prompt screens in the pop-up window. The manner of highlighting the video prompt screen may be as shown in FIG. 4a and FIG. 4b, and the video prompt screen may also be highlighted in other manners.

With the above technical solution, when the sub-video belonging to the second target hot topic selected by the user in the pop-up window is played, the video prompt screen corresponding to the selected second target hot topic can be completely displayed in the pop-up window, so that the user can more directly and clearly view the display content of the currently selected hot topic in the pop-up window, and can more clearly identify which hot topic in the pop-up window is selected.

Figure 5:
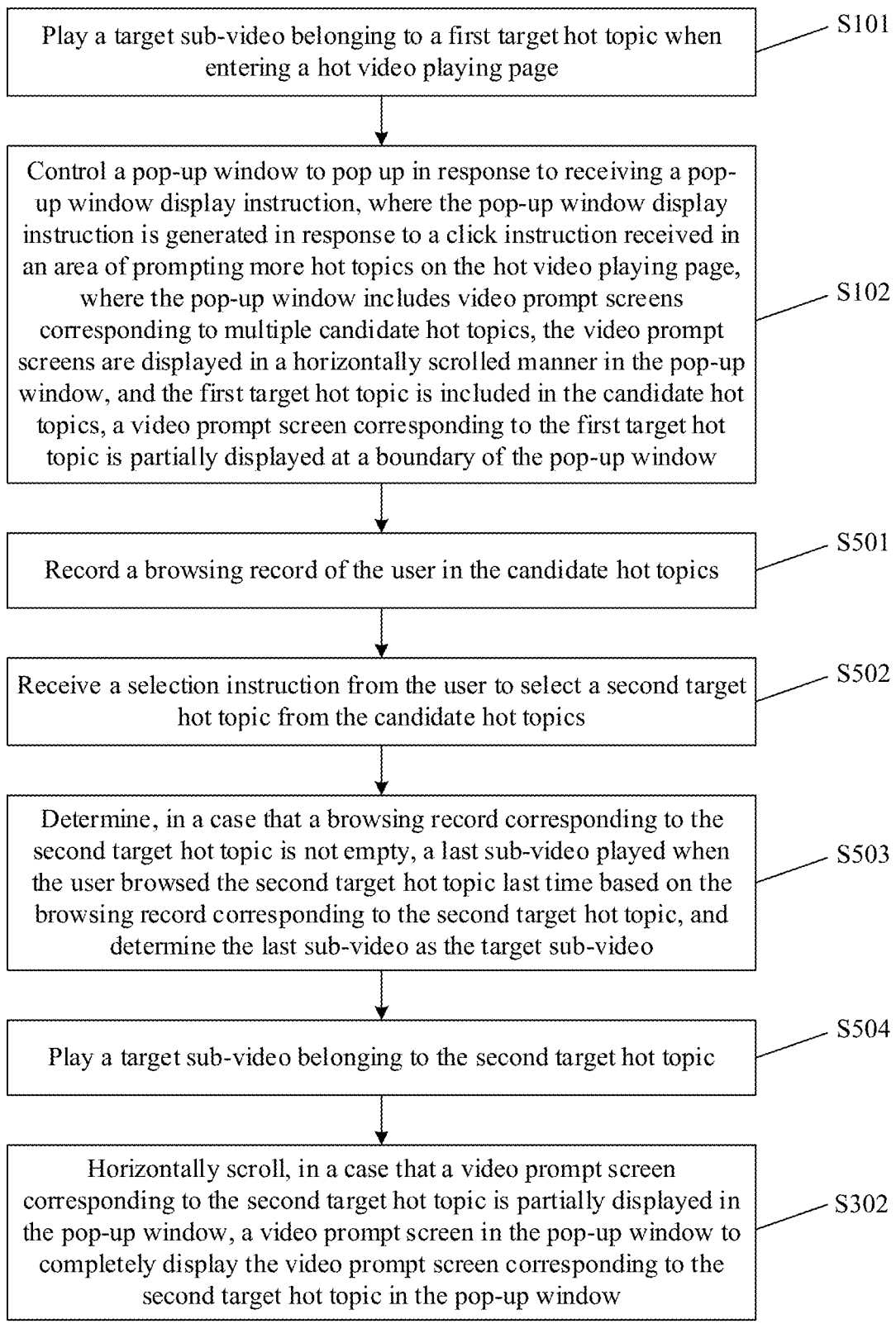
FIG. 5 is a flow chart of a method for controlling a pop-up window according to another embodiment of the present disclosure.

FIG. 5 is a flow chart of a method for controlling a pop-up window according to another embodiment of the present disclosure. As shown in FIG. 5, the method further includes steps S501 to S503.

In step S501, a browsing record of the user corresponding to each of the candidate hot topics is recorded. For example, when entering the hot video playing page, the target sub-video of the first target hot topic will be played, and the browsing record corresponding to the first target hot topic will be recorded. When the user selects another candidate hot topic as the second target hot topic to play when the third sub-video of the first target hot topic is being played, according to the browsing record corresponding to the first target hot topic, it can be known that the third sub-video belonging to the first target hot topic is the last played sub-video belonging to the first target hot topic. The browsing record is also recorded when playing a sub-video in another candidate hot topic.

Steps S502 and S504 are step S301 in FIG. 3. In step S502, a selection instruction from the user to select a second target hot topic from the candidate hot topics is received, and in step S504, the target sub-video belonging to the second target hot topic is played.

Before performing step S504, the method further includes step S503. In step S503, in a case that a browsing record corresponding to the second target hot topic is not empty, a last sub-video played when the user browsed the second target hot topic last time is determined based on the browsing record corresponding to the second target hot topic, and the last sub-video is determined to be the target sub-video.

For example, when entering the hot video playing page, when the third sub-video belonging to the first hot topic which is determined to be the first target hot topic is being played, the user selects the third hot topic as the second target hot topic to play. A playing status of sub-videos will be recorded in the browsing record corresponding to the first hot topic. When the user selects the first hot topic as the second target hot topic for playing again, the last sub-video played when playing the sub-videos belonging to the first hot topic last time may be determined based on the browsing record corresponding to the first hot topic, that is, the third sub-video, so that the last played sub-video can be used as the target sub-video for continually playing.

With the above technical solution, when browsing the candidate hot topics in the hot video playing page, the user is unnecessary to repeatedly watch the sub-videos in the candidate hot topics that have been viewed due to switching between different candidate hot topics, which greatly improves the user experience.

Figure 6:
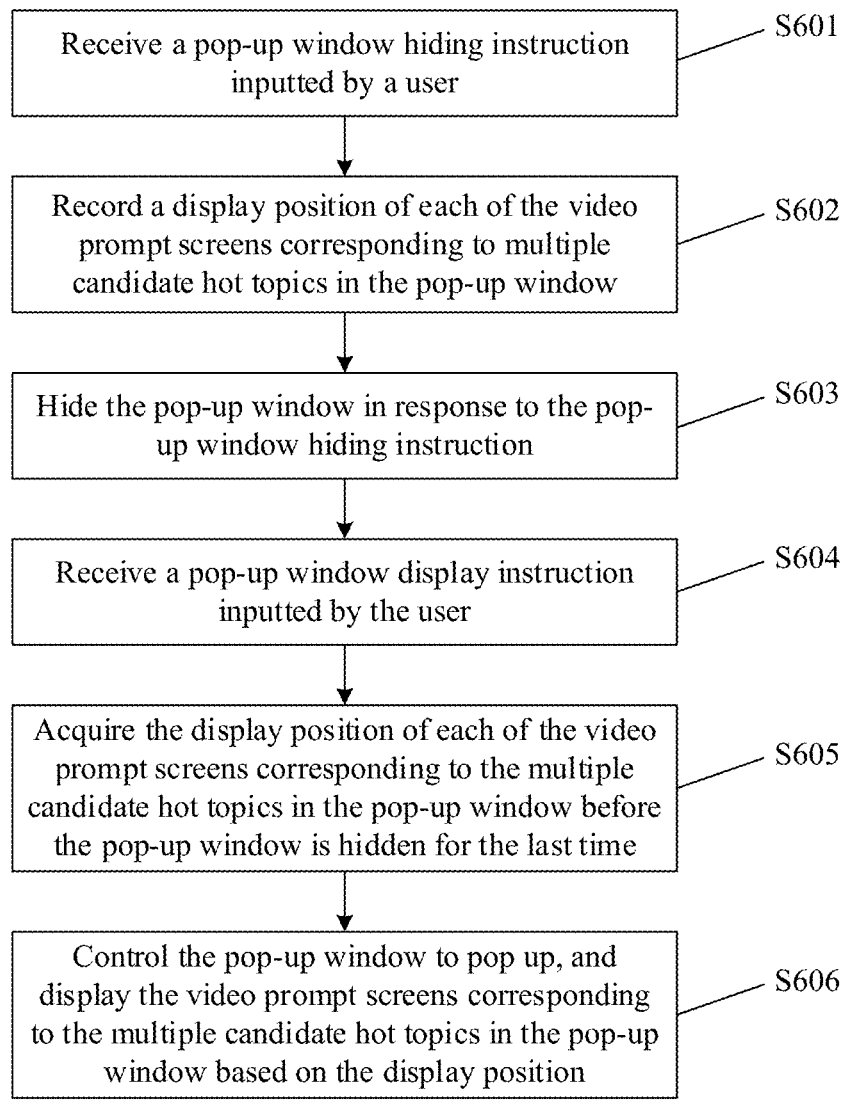
FIG. 6 is a flowchart of a process for hiding and popping up a pop-up window in a method for controlling a pop-up window according to an embodiment of the present disclosure.

FIG. 6 is a flowchart of a method for hiding and popping up a pop-up window in a method for controlling a pop-up window according to an embodiment of the present disclosure. As shown in FIG. 6, the method includes steps S601 to S606.

In step S601, a pop-up window hiding instruction inputted by a user is received. The user may input the pop-up window hiding instruction by clicking on a first designated area on the hot video playing page. The first designated area may be, for example, an area where a hidden button is displayed on the pop-up window, or may be any area on the hot video playing page other than the pop-up window, the display area for receiving the pop-up window hiding instruction is not limited in the present disclosure.

In step S602, a display position of each of the video prompt screens corresponding to the candidate hot topics in the pop-up window is recorded. As shown in FIG. 2b, if the pop-up window 2 in the hot video playing page 1 is in a display state as shown in FIG. 2b, and the user inputs the pop-up window hiding instruction, the display state of the pop-up window 2 will be recorded. When the pop-up window 2 pops up again, the display state shown in FIG. 2b may be maintained, that is, when the pop-up window 2 pops up again after being hidden, it may still display a part of the video prompt screen corresponding to the third hot topic and a part of the video prompt screen corresponding to the sixth hot topic, and the complete video prompt screen corresponding to the fourth hot topic and the complete video prompt screen corresponding to the fifth hot topic.

In step S603, the pop-up window is hidden in response to the pop-up window hiding instruction.

In step S604, a pop-up window display instruction inputted by the user is received. The user may pop up the pop-up window again for display by clicking on a second designated area on the hot video playing page. The second designated area may be the same as or different from the first designated area. For example, the second designated area may be the area 7 of prompting more hot topics as shown in FIG. 2a.

In step S605, the display position of each of the video prompt screens corresponding to the candidate hot topics in the pop-up window before the pop-up window is hidden for the last time is acquired.

In step S606, the pop-up window is controlled to pop up, and the video prompt screens corresponding to the candidate hot topics are displayed in the pop-up window based on the display position.

With the above technical solution, the pop-up window can remain in the state before being hidden when it is popped up and displayed again after being hidden, so that every time the pop-up window is popped up after being hidden, the user is unnecessary to select the hot topic in pop-up window by repeatedly sliding, thereby greatly improving the user experience.

In a possible embodiment, when the user exits the hot video playing page, the recorded browsing record corresponding to each of the candidate hot topics and/or the display position of each of multiple video prompt screens in the pop-up window will be cleared. That is, after the user exits the hot video playing page, the records related to the browsing status of the hot video playing page will not be retained. When the user enters the hot video playing page from another playing page again, browsing records corresponding to all candidate hot topics are empty, and a display position of each of multiple video prompt screens in the pop-up window is also be determined according to the playing status of the candidate hot topics in the current hot video playing page.

Figure 7:
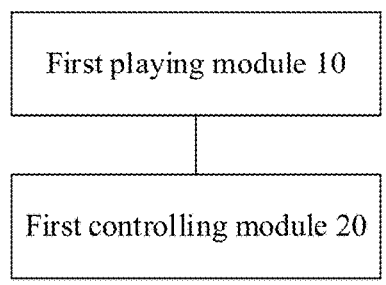
FIG. 7 is a structural block diagram of a device for controlling a pop-up window according to an embodiment of the present disclosure.

FIG. 7 is a structural block diagram of a device for controlling a pop-up window according to an embodiment of the present disclosure. As shown in FIG. 7, the device includes: a first playing module 10 and a first control module 20. The first playing module 10 is configured to play a target sub-video belonging to a first target hot topic when entering a hot video playing page. The first control module 20 is configured to control a pop-up window to pop up in response to receiving a pop-up window display instruction, where the pop-up window display instruction is generated in response to a click instruction received in an area of prompting more hot topics on the hot video playing page. The pop-up window includes video prompt screens corresponding to multiple candidate hot topics, the video prompt screens are displayed in a horizontally scrolled manner in the pop-up window, and the first target hot topic is included in the candidate hot topics, a video prompt screen corresponding to the first target hot topic is partially displayed at a boundary of the pop-up window.

With the above technical solution, the target sub-video belonging to the first target hot topic is directly played when entering the hot video playing page, so that the user can quickly obtain the hot topic content. After entering the hot video playing page, in response to receiving a pop-up window display instruction, the pop-up window is controlled to be popped up, so that the user can view other candidate hot topics by clicking on the area of prompting more hot topics without exiting the hot video playing page in a case that the user views the hot topic content after entering the hot video playing page. The pop-up window includes video prompt screens corresponding to multiple candidate hot topics, so that the user can obtain the specific content of the hot topics more clearly and intuitively. The video prompt screens can be displayed in a horizontally scrolled manner in the pop-up window, so that the number of displayed hot topics displayed in the pop-up window is not limited to the size of the pop-up window, and the user can view more candidate hot topics in the pop-up window. The video prompt screen corresponding to the first target hot topic is partially displayed at a boundary of the pop-up window when entering the hot video playing page, so that when the pop-up window pops up for the first time after entering the hot video playing page, more display space is reserved for other candidate hot topics in the pop-up window, so that the user can view more candidate hot topics without sliding the content of the pop-up window.

Figure 8:
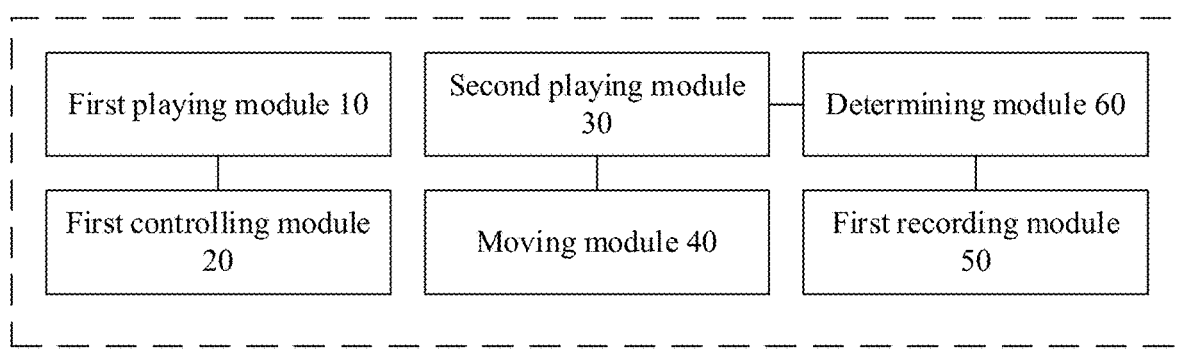
FIG. 8 is a structural block diagram of a device for controlling a pop-up window according to another embodiment of the present disclosure.

FIG. 8 is a structural block diagram of a device for controlling a pop-up window according to another embodiment of the present disclosure. The device further includes a second playing module 30, and a moving module 40. The second playing module 30 is configured to receive a selection instruction from a user to select a second target hot topic from the candidate hot topics, and play a target sub-video belonging to the second target hot topic. The moving module 40 is configured to horizontally scroll, in a case that a video prompt screen corresponding to the second target hot topic is partially displayed in the pop-up window, video prompt screens in the pop-up window to completely display the video prompt screen corresponding to the second target hot topic in the pop-up window.

In a possible embodiment, as shown in FIG. 8, the device further includes: a first recording module 50. The first recording module 50 is configured to record a browsing record of the user corresponding to each of the candidate hot topics. Before the second playing module 30 plays the target sub-video belonging to the second target hot topic, the device further includes: a determining module 60. The determining module 60 is configured to determine, in a case that a browsing record corresponding to the second target hot topic is not empty, a last sub-video played when the user browsed the second target hot topic last time based on the browsing record corresponding to the second target hot topic, and determine the last sub-video as the target sub-video.

In a possible embodiment, the device further includes: a first receiving module, a second recording module and a hiding module. The first receiving module is configured to receive a pop-up window hiding instruction inputted by the user. The second recording module is configured to a display position of each of the video prompt screens corresponding to the multiple candidate hot topics in the pop-up window. The hiding module is configured to hide the pop-up window in response to the pop-up window hiding instruction.

In a possible embodiment, the device further includes: a second receiving module, a third recording module, and a display module. The second receiving module is configured to receive the pop-up window display instruction inputted by the user. The third recording module is configured to acquire the display position of each of the video prompt screens corresponding to the multiple candidate hot topics in the pop-up window before the pop-up window is hidden for the last time. The display module is configured to control the pop-up window to pop up, and display the video prompt screens corresponding to the multiple candidate hot topics in the pop-up window based on the display position.

Figure 9:
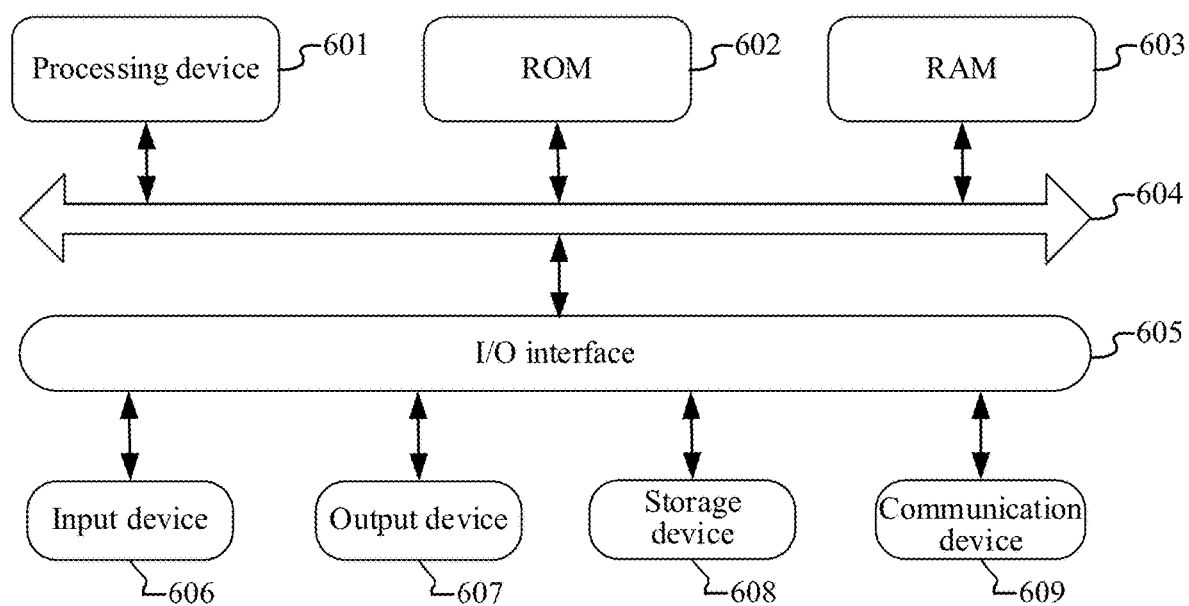
FIG. 9 is a schematic diagram of an electronic device according to an embodiment of the present disclosure.

Next, referring to FIG. 9, FIG. 9 is a schematic structural diagram of an electronic device 600 according to an embodiment of the present disclosure. The terminal device in the embodiments of the present disclosure may include, but is not limited to, mobile terminals such as mobile phones, notebook computers, digital broadcast receivers, Personal Digital Assistants (PDAs), Tablets (PADs), Portable Multimedia Players (PMPs), vehicle-mounted terminals (for example, in-vehicle navigation terminals), and stationary terminals such as digital TVs, desktop computers. The electronic device shown in FIG. 9 is only an example, and should not impose any limitation on the function and usage scope of the embodiments of the present disclosure.

As shown in FIG. 9, an electronic device 600 may include a processing device 601 (for example, a central processing unit, a graphics processor) that may perform various appropriate actions and processes based on the program stored in a read only memory (ROM) 602 or a program loaded into a random access memory (RAM) 603 from a storage device 608. In the RAM 603, various programs and data necessary for the operation of the electronic device 600 are also stored. The processing device 601, the ROM 602, and the RAM 603 are connected to each other through a bus 604. An input/output (I/O) interface 605 is also connected to bus 604.

Generally, the following devices may be connected to the I/O interface 605: an input devices 606 including, for example, a touch screen, a touchpad, a keyboard, a mouse, a camera, a microphone, an accelerometer, a gyroscope, and the like; an output device 607 including, for example, a liquid crystal display (LCD), a speaker, a vibrator, and the like; a storage device 608 including, for example, a magnetic tape, a hard disk, and the like; and a communication device 609. The communication device 609 may allow the electronic device 600 to communicate wirelessly or by wire with other devices to exchange data. While FIG. 9 shows the electronic device 600 having various means, it should be understood that not all of the illustrated means are required to be implemented or provided. Alternatively, more or fewer devices may be implemented or provided.

In particular, according to the embodiments of the present disclosure, the processes described above with reference to the flowcharts may be implemented as computer software programs. For example, a computer program product is provided according to an embodiment of the present disclosure, which includes a computer program carried on a non-transitory computer readable medium, the computer program contains program codes for performing the method illustrated in the flowchart. In such an embodiment, the computer program may be downloaded from the network via the communication device 609, or installed from the storage device 608 or the ROM 602. When the computer program is executed by the processing device 601, the above-mentioned functions defined in the method according to the embodiments of the present disclosure are implemented.

It should be noted that the computer-readable medium mentioned above in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus or device, or any combination thereof. More specific examples of computer readable storage medium may include, but are not limited to, electrical connections with one or more wires, portable computer disks, hard disks, random access memory (RAM), read only memory (ROM), erasable Programmable read only memory (EPROM or flash memory), optical fiber, portable compact disk read only memory (CD-ROM), optical storage devices, magnetic storage devices, or any suitable combination thereof. In this present disclosure, a computer-readable storage medium may be any tangible medium that contains or stores a program that can be used by or in conjunction with an instruction execution system, apparatus, or device. In the present disclosure, the computer-readable signal medium may include a data signal propagated in baseband or as part of a carrier wave with computer-readable program code embodied thereon. Such propagated data signal may take a variety of forms, including but not limited to electromagnetic signals, optical signals, or any suitable combination thereof. The computer-readable signal medium may also be any computer-readable medium other than the computer-readable storage medium, and can transmit, propagate, or transport the program for use by or in connection with the instruction execution system, apparatus, or device. Program codes embodied on a computer readable medium may be transmitted using any suitable medium including, but not limited to, electrical wire, optical fiber cable, RF (radio frequency), and the like, or any suitable combination thereof.

In some embodiments, the client or server may communicate using any currently known or future developed network protocol, such as HyperText Transfer Protocol (HTTP), and may interconnect with digital data communication (for example, communication network) in any form or medium. Examples of communication networks include local area networks (LAN), wide area networks (WAN), the network (for example, the Internet), and peer-to-peer networks (for example, ad hoc peer-to-peer networks), as well as any currently known or future development networks.

The above-mentioned computer-readable medium may be included in the above-mentioned electronic device, or may exist alone without being assembled into the electronic device.

The above-mentioned computer-readable medium carries one or more programs, and the one or more programs, when executed by the electronic device, cause the electronic device to perform step of: playing a target sub-video belonging to a first target hot topic when entering a hot video playing page; and controlling a pop-up window to pop up in response to receiving a pop-up window display instruction, where the pop-up window display instruction is generated in response to a click instruction received in an area of prompting more hot topics on the hot video playing page. The pop-up window includes video prompt screens corresponding to multiple candidate hot topics, the video prompt screens are displayed in a horizontally scrolled manner in the pop-up window, and the first target hot topic is included in the candidate hot topics, a video prompt screen corresponding to the first target hot topic is partially displayed at a boundary of the pop-up window.

Computer program codes for performing operations of the present disclosure may be written in one or more programming languages, including but not limited to object-oriented programming languages, such as Java, Smalltalk, C++, and conventional procedural programming languages, such as the "C" language or similar programming languages. The program codes may be executed entirely or partly on a computer of a user, executed as a stand-alone software package, executed partly on the computer of the user and partly on a remote computer, or entirely on the remote computer or server. In the case of a remote computer, the remote computer may be connected to the computer of the user through any kind of network, including a local area network (LAN) or a wide area network (WAN), or may be connected to an external computer (for example, via an Internet connection provided by an Internet service provider).

The flowchart and block diagrams in the drawings illustrate the architecture, functionality, and operation of possible implementations of systems, methods and computer program products according to the embodiments of the present disclosure. In this regard, each block in the flowchart or block diagrams may represent a module, a segment, or a portion of code that contains executable instructions for implementing the specified logical functions. It should also be noted that, in some alternative implementations, the functions noted in the blocks may be executed out of the order noted in the figures. For example, two blocks shown in succession may, in fact, be executed substantially concurrently, or may be executed in the reverse order, depending upon the functionality involved. It is also noted that each block of the block diagrams and/or flowchart illustrations, and combinations of blocks in the block diagrams and/or flowchart illustrations, can be implemented in dedicated hardware-based systems that perform the specified functions or operations, or may be implemented in a combination of dedicated hardware and computer instructions.

The modules involved in the embodiments of the present disclosure may be implemented in software or hardware. The name of the module does not constitute a limitation of the module itself under certain circumstances, for example, the first receiving module may also be described as "a module that receives a pop-up window display instruction".

The functions described herein above may be performed, at least in part, by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and the like.

In the context of the present disclosure, a machine-readable medium may be a tangible medium that may contain or store a program for use by or in connection with the instruction execution system, apparatus or device. The machine-readable medium may be a machine-readable signal medium or a machine-readable storage medium, the machine-readable medium may include, but is not limited to, electronic, magnetic, optical, electromagnetic, infrared, or semiconductor systems, apparatuses, or devices, or any suitable combination thereof. More specific examples of machine-readable storage medium may include one or more wire-based electrical connections, portable computer disks, hard disks, random access memory (RAM), read only memory (ROM), erasable programmable read only memory (EPROM or flash memory), fiber optics, compact disk read only memory (CD-ROM), optical storage devices, magnetic storage devices, or any suitable combination thereof.

According to one or more embodiments of the present disclosure, a method for controlling a pop-up window is provided in Example 1, which includes: playing a target sub-video belonging to a first target hot topic when entering a hot video playing page; and controlling a pop-up window to pop up in response to receiving a pop-up window display instruction, where the pop-up window display instruction is generated in response to a click instruction received in an area of prompting more hot topics on the hot video playing page. The pop-up window includes video prompt screens corresponding to multiple candidate hot topics, the video prompt screens are displayed in a horizontally scrolled manner in the pop-up window, and the first target hot topic is included in the candidate hot topics, a video prompt screen corresponding to the first target hot topic is partially displayed at a boundary of the pop-up window.

According to one or more embodiments of the present disclosure, in Example 2, the method of Example 1 further includes: receiving a selection instruction from a user to select a second target hot topic from the candidate hot topics, and playing a target sub-video belonging to the second target hot topic; and horizontally scrolling, in a case that a video prompt screen corresponding to the second target hot topic is partially displayed in the pop-up window, video prompt screens in the pop-up window to completely display the video prompt screen corresponding to the second target hot topic in the pop-up window.

According to one or more embodiments of the present disclosure, in Example 3, the method of Example 2 further includes: recording a browsing record of the user corresponding to each of the candidate hot topics. Before the playing a target sub-video belonging to the second target hot topic, the method further includes: determining, in a case that a browsing record corresponding to the second target hot topic is not empty, a last sub-video played when the user browsed the second target hot topic last time based on the browsing record corresponding to the second target hot topic, and determining the last sub-video as the target sub-video.

According to one or more embodiments of the present disclosure, in Example 4, the method of Examples 1 to 3 further includes: receiving a pop-up window hiding instruction inputted by a user; recording a display position of each of the video prompt screens corresponding to the multiple candidate hot topics in the pop-up window; and hiding the pop-up window in response to the pop-up window hiding instruction.

According to one or more embodiments of the present disclosure, in Example 5, the method of Example 4 further includes: receiving the pop-up window display instruction inputted by the user; acquiring the display position of each of the video prompt screens corresponding to the multiple candidate hot topics in the pop-up window before the pop-up window is hidden for the last time; and controlling the pop-up window to pop up, and displaying the video prompt screens corresponding to the multiple candidate hot topics in the pop-up window based on the display position.

According to one or more embodiments of the present disclosure, in Example 6, a device for controlling a pop-up window is provided, which includes a first playing module and a first controlling module. The first playing module is configured to play a target sub-video belonging to a first target hot topic when entering a hot video playing page. The first controlling module is configured to control a pop-up window to pop up in response to receiving a pop-up window display instruction, where the pop-up window display instruction is generated in response to a click instruction received in an area of prompting more hot topics on the hot video playing page. The pop-up window includes video prompt screens corresponding to multiple candidate hot topics, the video prompt screens are displayed in a horizontally scrolled manner in the pop-up window, and the first target hot topic is included in the candidate hot topics, a video prompt screen corresponding to the first target hot topic is partially displayed at a boundary of the pop-up window.

According to one or more embodiments of the present disclosure, in Example 7, the device of Example 6 further includes a second playing module and a moving module. The second playing module is configured to receive a selection instruction from a user to select a second target hot topic from the candidate hot topics, and play a target sub-video belonging to the second target hot topic. The moving module is configured to horizontally scroll, in a case that a video prompt screen corresponding to the second target hot topic is partially displayed in the pop-up window, video prompt screens in the pop-up window to completely display the video prompt screen corresponding to the second target hot topic in the pop-up window.

According to one or more embodiments of the present disclosure, in Example 8, the device of Example 7 further includes a first recording module. The first recording module is configured to record a browsing record of the user corresponding to each of the candidate hot topics. Before the second playing module plays the target sub-video belonging to the second target hot topic, the device further includes a determining module. The determining module is configured to determine, in a case that a browsing record corresponding to the second target hot topic is not empty, a last sub-video played when the user browsed the second target hot topic last time based on the browsing record corresponding to the second target hot topic, and determine the last sub-video as the target sub-video.

According to one or more embodiments of the present disclosure, in Example 9 a computer-readable medium is provided, which includes a computer program stored thereon. The computer program, when executed by a processing device, performs steps of the method described in any one of Examples 1 to 5.

According to one or more embodiments of the present disclosure, in Example 9, an electronic device is provided, which includes a storage device and a processing device. The storage device is configured to store a computer program. The processing device is configured to execute the computer program in the storage device, to perform steps of the method described in any one of Examples 1 to 5.

The above description merely illustrates the embodiments of the present disclosure and the technical principles employed. Those skilled in the art should understand that the scope of present disclosure is not limited to the technical solutions formed by any combination of the above-mentioned technical features, and should also cover other technical solutions formed by any combination of the above-mentioned technical features and any equivalent features without departing from the above disclosed concept, for example, a technical solution formed by replacing the above features with the technical features disclosed in the present disclosure (but not limited to) with similar functions.

Additionally, although operations are described in a particular order, this should not be construed that the operations are performed in the particular order shown or in a sequential order. Under certain circumstances, multitasking and parallel processing may be advantageous. Although several implementation-specific details are described above, these should not be construed as limitations on the scope of the present disclosure. Certain features that are described in the context of a single embodiment may also be applied in a single embodiment. Conversely, features that are described in the context of a single embodiment may also be applied in multiple embodiments separately or in any suitable sub combination.

Although the subject matter has been described in language specific to structural features and/or method logical acts, it is to be understood that the subject matter defined in the claims is not necessarily limited to the specific features or acts described above. Rather, the specific features and acts described above are merely example forms of implementing the claims. Regarding the device in the above embodiment, the specific manner in which each module performs operations has been described in detail in the embodiment of the method, and will not be described in detail here.

What is claimed is:
1. A method of playing videos, comprising:
   presenting a video playing page;
   popping up a window on the video playing page;
   displaying prompt screens in the window, wherein each prompt screen in the window corresponds to a content item;
   displaying additional prompt screens in the window in a horizontally scrolled manner;
   in response to receiving a trigger operation performed on a prompt screen in the window, displaying a content item corresponding to the prompt screen in the video playing page;
   wherein the method further comprises:
   hiding the window in response to a first instruction;
   receiving a second instruction for displaying the window;
   acquiring display positions of each prompt screen in the window before the window was last hidden; and controlling the window to pop up and displaying each prompt screen in the window based on the acquired display positions.

2. The method of claim 1, wherein the video playing page comprises a first area configured to play a video and a second area configured to display information associated with the video and additional videos.

3. The method of claim 2, further comprises:
automatically displaying the information in a scrolled manner in the second area, wherein the second area is located at a bottom of the video playing page.

4. The method of claim 1, wherein the popping up a window on the video playing page further comprises:
popping up the window from a bottom of the video playing page; and
overlaying the window on a part of the video playing page.

5. The method of claim 4, further comprising:
overlaying the window on the part of the video playing page in a partially transparent form.

6. The method of claim 1, wherein in response to receiving the trigger operation performed on the prompt screen in the window, the method further comprises:
in response to determining that the prompt screen is partially displayed in the window, automatically move the prompt screen for a distance so as to completely display the prompt screen in the window; and
automatically moving other prompt screens than the prompt screen for the distance while moving the prompt screen to ensure that relative positions among the prompt screens remain unchanged.

7. The method of claim 1, further comprising:
visually differentiating the prompt screen from other prompt screens in the window by highlighting the prompt screen.

8. The method of claim 1, further comprising:
receiving the first instruction of hiding the window;
recording display positions of each prompt screen in the window; and
hiding the window in response to the first instruction after recording the display positions.

9. An electronic device of playing videos, comprising:
a processor; and
a memory communicatively coupled to the processor and comprising computer-readable instructions that upon execution by the processor cause the processor to perform operations comprising:
presenting a video playing page;
popping up a window on the video playing page;
displaying prompt screens in the window, wherein each prompt screen in the window corresponds to a content item;
displaying additional prompt screens in the window in a horizontally scrolled manner;
in response to receiving a trigger operation performed on a prompt screen in the window, displaying a content item corresponding to the prompt screen in the video playing page;
wherein the operations further comprise:
hiding the window in response to a first instruction;
receiving a second instruction for displaying the window;
acquiring display positions of each prompt screen in the window before the window was last hidden; and
controlling the window to pop up and displaying each prompt screen in the window based on the acquired display positions.

10. The electronic device of claim 9, wherein the video playing page comprises a first area configured to play a video and a second area configured to display information associated with the video and additional videos.

11. The electronic device of claim 10, the operations further comprising:
automatically displaying the information in a scrolled manner in the second area, wherein the second area is located at a bottom of the video playing page.

12. The electronic device of claim 9, wherein the popping up a window on the video playing page further comprises:
popping up the window from a bottom of the video playing page; and
overlaying the window on a part of the video playing page.

13. The electronic device of claim 9, wherein in response to receiving the trigger operation performed on the prompt screen in the window, the operations further comprise:
in response to determining that the prompt screen is partially displayed in the window, automatically move the prompt screen for a distance so as to completely display the prompt screen in the window; and
automatically moving other prompt screens than the prompt screen for the distance while moving the prompt screen to ensure that relative positions among the prompt screens remain unchanged.

14. The electronic device of claim 9, the operations further comprising:
visually differentiating the prompt screen from other prompt screens in the window by highlighting the prompt screen.

15. The electronic device of claim 9, the operations further comprising:
receiving the first instruction of hiding the window;
recording display positions of each prompt screen in the window; and
hiding the window in response to the first instruction after recording the display positions.

16. A non-transitory computer-readable storage medium, storing computer-readable instructions that upon execution by a processor cause the processor to implement operations comprising:
presenting a video playing page;
popping up a window on the video playing page;
displaying prompt screens in the window, wherein each prompt screen in the window corresponds to a content item;
displaying additional prompt screens in the window in a horizontally scrolled manner;
in response to receiving a trigger operation performed on a prompt screen in the window, displaying a content item corresponding to the prompt screen in the video playing page;
wherein the operations further comprise:
hiding the window in response to a first instruction;
receiving a second instruction for displaying the window;
acquiring display positions of each prompt screen in the window before the window was last hidden; and
controlling the window to pop up and displaying each prompt screen in the window based on the acquired display positions.

17. The non-transitory computer-readable storage medium of claim 16, wherein the video playing page comprises a first area configured to play a video and a second area configured to display information associated with the video and additional videos.

18. The non-transitory computer-readable storage medium of claim 16, wherein the popping up a window on the video playing page further comprises:

popping up the window from a bottom of the video playing page; and overlaying the window on a part of the video playing page in a partially transparent form.

\* \* \* \* \*